(12) United States Patent
Yu

(10) Patent No.: US 7,804,888 B2
(45) Date of Patent: Sep. 28, 2010

(54) VOICE MODEM PROTOCOL FOR UNINTERRUPTED DATA CONNECTION

(75) Inventor: Jinguo Yu, Flemington, NJ (US)

(73) Assignee: Agere Systems Inc., Allentown, PA (US)

( * ) Notice: Subject to any disclaimer, the term of this patent is extended or adjusted under 35 U.S.C. 154(b) by 1362 days.

(21) Appl. No.: 11/197,223

(22) Filed: Aug. 4, 2005

(65) Prior Publication Data

US 2007/0030889 A1 Feb. 8, 2007

(51) Int. Cl.
- *H04B 1/38* (2006.01)
- *H04M 11/00* (2006.01)
- *H04N 7/16* (2006.01)
- *H04N 7/173* (2006.01)

(52) U.S. Cl. ................ 375/222; 379/93.07; 725/25; 725/119

(58) Field of Classification Search ................ 375/222, 375/22; 379/93.07; 725/25, 119
See application file for complete search history.

(56) References Cited

U.S. PATENT DOCUMENTS

| | | | | |
|---|---|---|---|---|
| 6,151,335 A | * | 11/2000 | Ko et al. | 370/487 |
| 6,212,227 B1 | * | 4/2001 | Ko et al. | 375/222 |
| 6,466,656 B1 | * | 10/2002 | Evans et al. | 379/93.07 |
| 6,889,385 B1 | * | 5/2005 | Rakib et al. | 725/119 |
| 7,003,094 B2 | * | 2/2006 | Fischer et al. | 379/406.01 |
| 7,173,944 B1 | * | 2/2007 | Ko et al. | 370/487 |
| 2004/0181800 A1 | * | 9/2004 | Rakib et al. | 725/25 |
| 2005/0111346 A1 | * | 5/2005 | Santhoff et al. | 370/203 |
| 2005/0113045 A1 | * | 5/2005 | Santhoff et al. | 455/130 |

FOREIGN PATENT DOCUMENTS

| | | | | |
|---|---|---|---|---|
| WO | WO2004015913 | | * | 2/2004 |
| WO | WO2004015913 | A1 | * | 2/2004 |

* cited by examiner

*Primary Examiner*—Mohammad H Ghayour
*Assistant Examiner*—Sarah Hassan
(74) *Attorney, Agent, or Firm*—Ryan, Mason & Lewis, LLP

(57) ABSTRACT

A back-up solution is presented for a DSL modem that guarantees essentially uninterrupted data connections in the event of a failure in the DSL connection. When a DSL data connection fails, e.g., due to changes of the local loop characteristics in the high frequency band, a voice-band modem is used in conjunction with an amplitude modulator/demodulator to keep the data connection uninterrupted by shifting the voice-band modem signal up to DSL frequencies, transmitting the data at this higher frequency over the local loop between the subscriber and a DSLAM, and then shifting the voice-band modem signal back to a "normal" frequency and demodulating this signal using the voice-band modem before it enters the data network. Since the frequency band used is at a frequency higher than that of voice communications, the subscriber can continue to use the local loop to conduct voice communications or any other communications that require use of the voice band frequencies, such as facsimile and V. series modem communications.

20 Claims, 4 Drawing Sheets

VOICE MODEM PROTOCOL FOR UNINTERRUPTED DATA CONNECTION

BACKGROUND OF THE INVENTION

1. Field of the Invention

The present invention relates to the transmission of information over a digital subscriber line (DSL).

2. Description of the Related Art

The use of digital subscriber line (DSL) technology has increased in recent years, allowing high-speed (i.e., broadband) access from a central location, typically a telephone central office, to multiple subscribers in homes or offices. The particular advantage of DSL over various other forms of broadband communication is that DSL allows the use of existing copper telephone lines from the central office to the end-user, often referred to as the "local loop", or simply "loop". A typical DSL application is for connecting the subscriber to the Internet via the telephone central office, but other uses are possible.

Twisted pair wires have a wide frequency over which information may be transmitted. The "voice band" or "analog band" portion of the frequency spectrum ranges from between 0 and 4 kHz and, as noted above, is typically between about 3-4 kHz. This portion of the voice channel is also used for low-speed modems of the V. series (e.g., V.32, V.34, V.90, and V.92); thus, V. series modems cannot be used simultaneously with voice transmissions over the same telephone line, i.e., if the line is being used by the modem, it can't be used for telephone voice communications. DSL, on the other hand, uses higher frequency bands, for example, from 25 kHz and up to about 1.1 mHz, over the same twisted pair wires. Since this voice band and the higher DSL band are discrete frequencies, a user is able to transmit/receive data over the DSL band while simultaneously using the voice band for voice communications or V. series analog modem data communications, including facsimile transmissions.

The traditional twisted-pair copper loop has characteristics such that the signal attenuation increases along with the signal frequency. Regular phone service uses the frequency band (0 Hz to 4 kHz), which is extremely stable and reliable and is relatively insensitive to weather-related conditions. By contrast, most of the DSL services deployed in the field use the ITU G.992.1 standard with an upstream band (28.875 kHz to 138 kHz) and a downstream band (138 kHz to 1104 kHz). Weather conditions such as temperature and humidity can dramatically change the characteristics of the wires on these DSL bands between the DSL modem located at a customer premises and a DSL access multiplexer (DSLAM) at the central office. Due to the characteristics of the signal attenuation, the upstream connection may be less problematic than the downstream. But if the downstream link is broken, the DSL connection fails. Sometimes the change in characteristics may have little effect on the voice band and minor effect on the lower end of the DSL upstream frequency band, and thus, the customer's voice band channel will seem to be experiencing no difficulty while the DSL frequencies do. These characteristic changes can be of such severity that the DSL modem data connection can fail completely.

Since such loss of data communications can be catastrophic, particularly in a business situation where data transmission is critical to the business, the typical back-up alternative used when a DSL data connection fails is to connect over the voice band using a V. series modem. In addition to being a slower connection, this solution disrupts the data flow (while the V. modem connection is established) and also prohibits the use of the telephone line over which the data is being transmitted for any purpose other than the data transmission, e.g., for voice communications. In addition, this requires the user to incur the additional expense of subscribing to a dial-up service as a back-up mechanism for data transmission. Typically this back-up dial-up service will be rarely used, since optimally the DSL connection will operate properly most of the time. Thus, the user ends up paying additional money for a back-up dial-up line that may never be used or be rarely used. Accordingly, it would be desirable to have a back-up system available that would, essentially seamlessly, allow use of the voice band for voice communications while allowing simultaneous data transmission at the DSL frequencies over the same telephone line.

SUMMARY OF THE INVENTION

The present invention provides a back-up solution for a DSL modem that guarantees essentially uninterrupted data connections in the event of a failure in the DSL connection. In accordance with the present invention, when a DSL connection experiences failure, a voice-band modem (e.g., a V-series modem) automatically establishes a data connection over the telephone line to which the failed DSL modem is connected, but at a frequency above the frequency used for voice communications. When a DSL data connection fails, e.g., due to changes of the local loop characteristics in the high frequency band, the voice-band modem is used in conjunction with an amplitude modulator/demodulator to keep the data connection uninterrupted by shifting the voice-band modem signal up to DSL frequencies, transmitting the data at this higher frequency over the local loop between the subscriber and a DSLAM, and then shifting the voice-band modem signal back to a "normal" frequency and demodulating this signal using the voice-band modem before it enters the data network. Since the frequency band used is at a frequency higher than that of voice communications, the subscriber can continue to use the local loop to conduct voice communications or any other communications that require use of the voice band frequencies, such as facsimile and V. series modem communications.

DETAILED DESCRIPTION OF THE PREFERRED EMBODIMENTS

Figure 1:
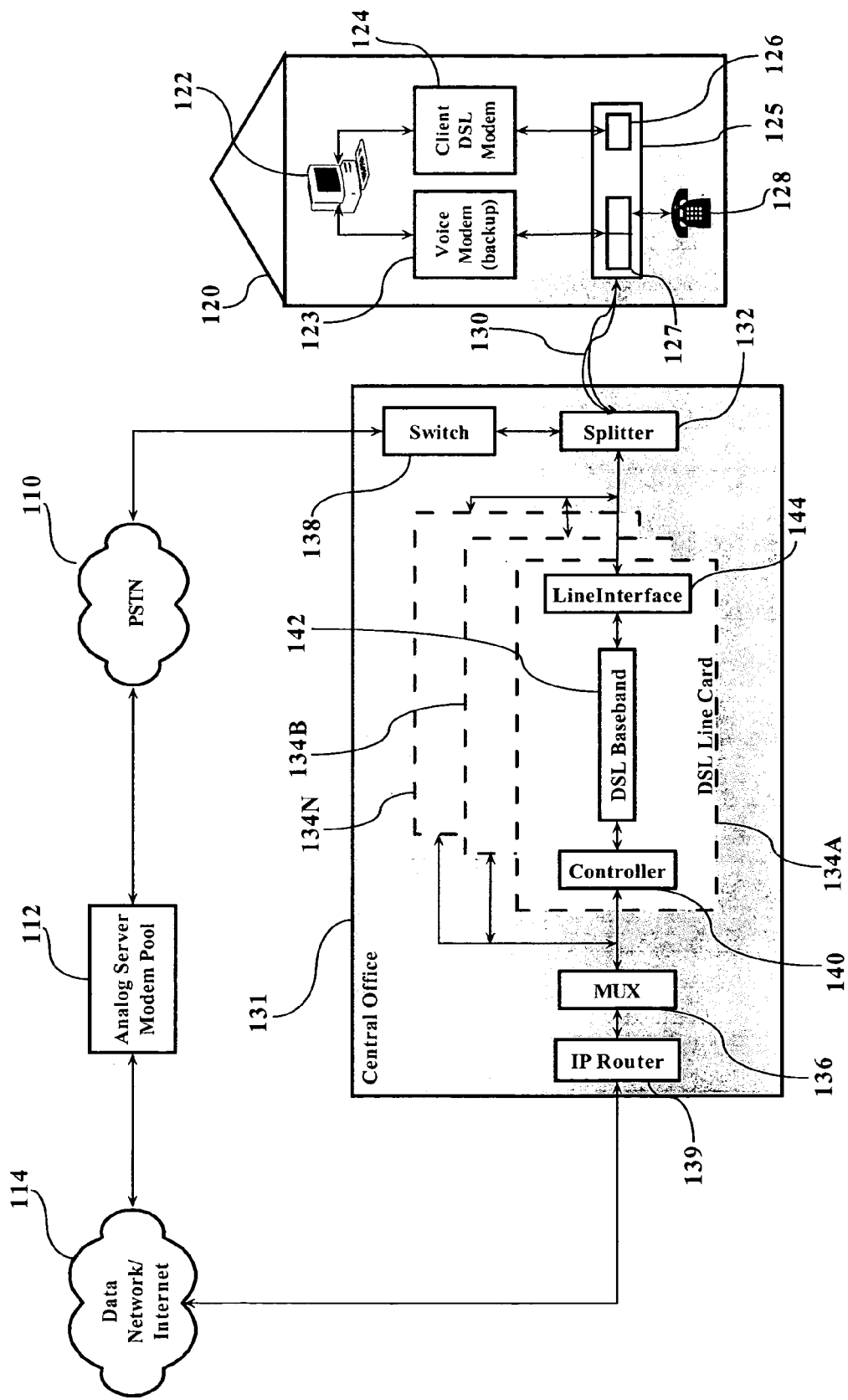
FIG. 1 illustrates a typical DSL system of the prior art.

To better understand the present invention, it is important to understand the operation of a typical prior art DSL system. FIG. 1 illustrates a typical DSL system of the prior art. A telephone subscriber residing in house 120 (referred to herein as "the subscriber side") is connected to a central office 131 and a data network/Internet 114 (referred to collectively herein as "the network side") via a twisted-pair wire 130 that enters the house 120.

On the subscriber side, twisted-pair wire 130 enters splitter 125. Splitter 125 has two major components: a Low-Pass filter and a High-Pass filter. The Low-Pass filter routes the voice band signals traveling over twisted pair 130 through connector 127 to the typical equipment used with a PSTN connection. In this example, it connects to a telephone set 128 via connector 127 reserved for voice band signals. In a well-known manner, telephone set 128 communicates over twisted-pair 130 using voice-band frequencies (those between zero and 4 kHz).

The High-Pass filter of splitter 125 routes the signals traveling over twisted pair 130 to client DSL modem 124 via connector 126, reserved for DSL band signals. Client DSL modem 124 is, via USB or Ethernet interface, connected to and typically controlled by communication device 122, e.g., a PC. A backup voice-band modem 123, such as a previously described V-series modem, in turn is also connected to and controlled by communication device 122 via voice band connector 127.

Under normal operating conditions, DSL modem 124 facilitates data communications between communication device 122 and IP router 139, through splitter 132, DSL line card 134A, and MUX 136 over twisted pair 130 using the higher DSL frequencies (e.g., greater than 4 kHz), and telephone set 128 facilitates voice communications to the PSTN network 110 through splitter 132 and switch 138. Since when using client DSL modem 124 communication device 122 is using a different set of frequencies (DSL band signals) than those used by telephone set 128 (voice band signals), twisted-pair wire 130 can be used to simultaneously transmit and receive both voice signals used by telephone set 128 and data signals used by communication device 122.

On the network side, splitter 132 manages the flow of traffic to assure that signals at voice-band frequencies are routed to PSTN 110 and signals at the higher frequency DSL bands are routed to DSL modem line card 134A (and on to the data network/Internet 114). FIG. 1 also illustrates a MUX 136 situated between DSL modem line card 134A and IP router 139 which is connected to the data network/Internet 114. MUX 136 enables multiple DSL modem line cards 134A, 134B, . . . 134N to be "funneled" to the same data network/Internet 114 through IP router 139 as shown.

The operation of the prior art system of FIG. 1 is as follows. When voice communication is desired, telephone set 128 is coupled to PSTN 110 via splitter 125, twisted pair 130, splitter 132, and switch 138. These voice communications are carried out using the low-frequency voice-band, since telephone set 128 is connected to voice band connector 127. Data-communication device 122 can simultaneously connect to data network/Internet 114 via client DSL modem 124, splitter 125, twisted pair 130, splitter 132, DSL modem line card 134A, MUX 136, and IP router 139. These data communications are carried out using the higher frequency DSL band, since client DSL modem 124 is connected to DSL band connector 126 through a high pass filter.

A problem exists, however, when the DSL connection fails. If the DSL connection is dropped for any reason (line noise, modem failure, etc.), backup voice band modem 123 can be activated to initiate a dialup connection for data communication using the voice-band frequencies, accessed via voice band connector 127. This requires the backup voice band modem 123 to "take" the voice-band frequencies (assuming they are available) and establish a voice band route to data network/Internet 114 via the PSTN 110 and an Analog Server Modem Pool 112 which is connected to data network/Internet 114. Since this backup data connection is established over twisted pair 130 at the same low-frequency used by telephone set 128, when data-communication device 122 is using the backup voice band modem 123, telephone set 128 cannot be used for voice communications. If the voice band is in use by the telephone set 128, the backup data connection will not be able to be established. Thus, the data connection between data communication device 122 and the data network/Internet will be lost.

Figure 2:
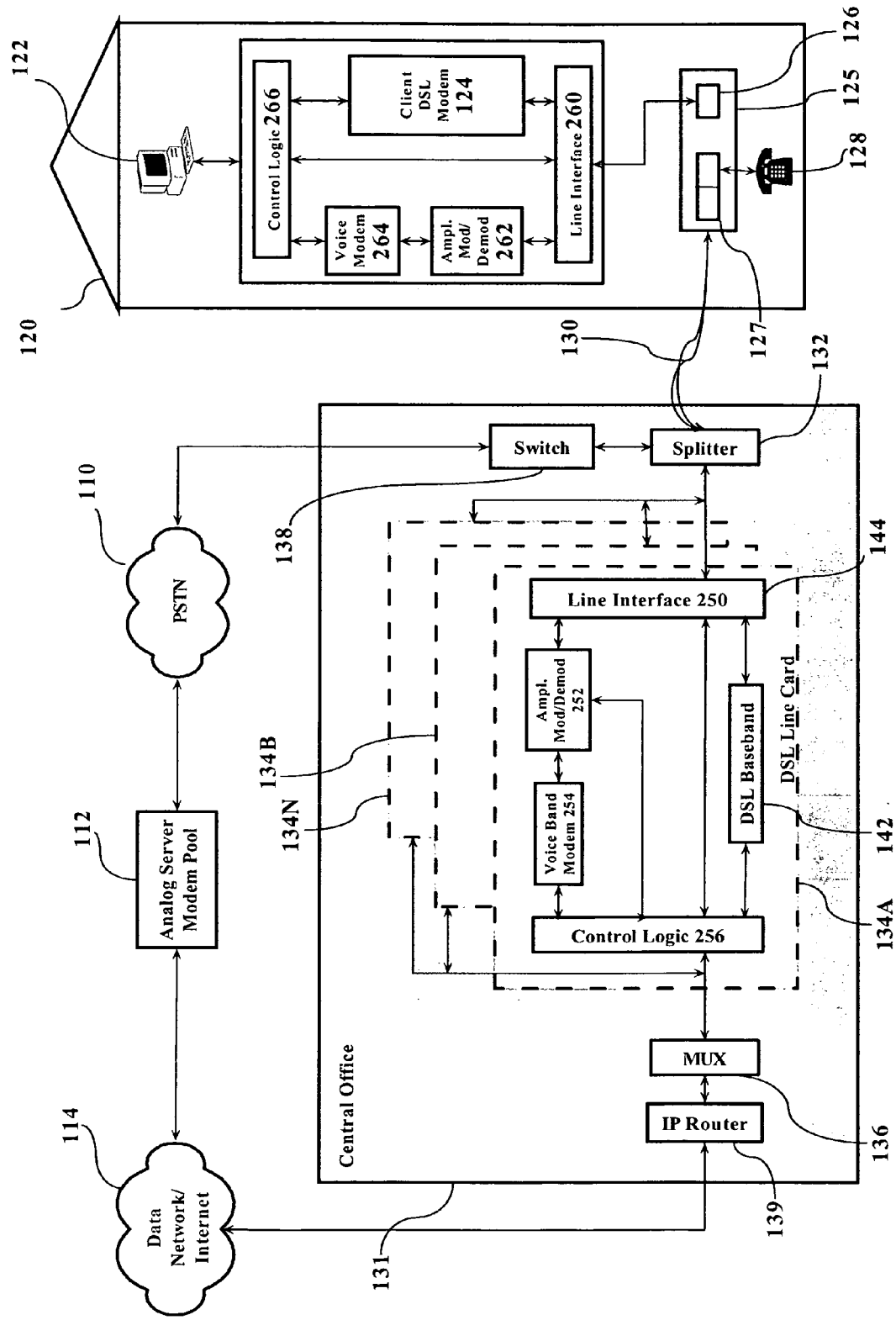
FIG. 2 illustrates the architecture of a first embodiment of the present invention.

FIG. 2 illustrates a first embodiment of the present invention that solves the problem described above associated with a failure of the DSL connection. Referring to FIG. 2, a backup voice modem 264 is coupled to amplitude modulator/demodulator 262. Amplitude modulator/demodulator 262 comprises an amplitude encoder, an amplitude decoder, and multiple band-pass filters. The amplitude encoder shifts the frequency of voice band signals (0-4 kHz) up to a DSL pass band, e.g., 25-29 kHz. The amplitude decoder shifts the encoded voice band signal back down to the 0-4 kHz level. Among other things, the band-pass filters assure that any out-band aliasing of the signal due to encoding/decoding is eliminated. For control of backup voice modem 264, amplitude modulator/demodulator 262, and client DSL modem 124, control logic 266 is situated between data communication device 122 and these elements. Control logic 266 can comprise, for example, an interface connected to a PC, such as an Ethernet, USB, or other interface; a processor to perform status checks and execute control algorithms; memory such as RAM or ROM to restore the status information and the code running on the processor; and an interface to monitor the status of the DSL modem, voice modem, and amplitude modem. Control logic 266 monitors the DSL status (signed quality, data bit error rate) to determine the health of the DSL data connection. When there is a DSL failure, control logic 266 switches off the client DSL modem 124 and switches on the backup voice modem 264 and amplitude modulator/demodulator 262. A predetermined signal, e.g., a series of tones, is generated by the backup voice modem 264 to signal the CO side to switch the data connection from DSL to voice modem and then issue a startup command to the voice modem.

Control logic 256 on the CO side functions in a manner similar to control logic 266 on the subscriber side. The backup voice band modem 254 is coupled to an amplitude modulator/demodulator 252. From a functional standpoint, amplitude modulator/demodulator 252 is the same as amplitude modulator/demodulator 262, enabling the shifting between the voice-band signal to the higher frequency band and back again. Control logic 256 functions essentially the same as control logic 266. Control logic 256 can monitor the data traffic flow; if the data traffic is dormant for a predetermined period of time, control logic 256 can switch the voice-modem 232 off and switch back to DSL to see if it is functioning. If the DSL connection is found to be functioning, the DSL connection is maintained in the active state; otherwise, the voice-modem 252 will be reactivated to keep the data connection alive. All switching between the voice-modem connection and the DSL connection is transparent to the user. The user may experience some slowness in data traffic in the event of DSL failure, but he/she will not be required to take any action to keep the data connection alive.

To facilitate interfacing the splitter 125 with the client DSL modem 124 and backup voice-modem 264, line interface 260 is situated therebetween, as shown. Line interface 260 can comprise, for example, simple RJ11 interfaces and a switch to route signals from the client DSL modem 124 or amplitude modulator/demodulator 262 (and thus from backup voice-modem 264) to DSL band connector 126, and vice versa.

On the CO side, each modem card 134A, 134B, . . . 134n is configured similarly to the subscriber side, that is, for modem card 134A, splitter 132 feeds into a line interface 250, which is coupled to DSL modem 142 and to a combination of backup voice modem 254 and amplitude modulator/demodulator 252, all of which are in turn connected to control logic 256. Control logic 256 is in turn connected to data network 114 (via MUX 136 and IP router 139 in this example).

Under normal operating conditions, client DSL modem 124 will carry the data communications between data-communication device 122 and data network 114 via twisted pair 130, splitter 132, line interface 250, DSL modem 142, control logic 256 and, in this example, MUX 136 and IP router 139. However, if the DSL connection fails (which failure will be detected by control logic 266), backup voice modem 264 is utilized to connect data-communication device 122 with the data network/Internet 114. However, in accordance with the present invention, the digital data will be converted into analog voice-band signals by voice-modem 264, and this voice modem signal is amplitude modulated by amplitude modulator/demodulator 262 so that its passband frequency is increased to a range above that of the voice band, e.g., above 0-4 kHz. The signal is carried along twisted pair 130 at this higher frequency and thus, when it hits splitter 132, is directed across DSL modem card 134A, since it is at the higher frequency. The signal remains at this higher frequency until it is demodulated back to its original frequency range by amplitude modulator/demodulator 252, and then voice-modem 254 decodes the analog signal back to digital data, which is then transmitted to the data network/Internet 114 through control logic 256, MUX 136, and IP router 139. The digital data from data network/Internet 114 will go through a similar path to device 122, in the opposite direction. Thus, when the data signals are being transmitted to and from data-communication device 122 and data network/Internet 114, they utilize the high frequency portion of twisted pair 130, thereby allowing telephone set 128 to continue to use the low-frequency voice-band for voice communications. FIG. 2 thus illustrates a use of DSL service via a telephone company, where the user's access to the Internet is actually routed through the telephone company's IP router 139 via a physical link from the CO to the user's house over a twisted local loop.

Figure 3:
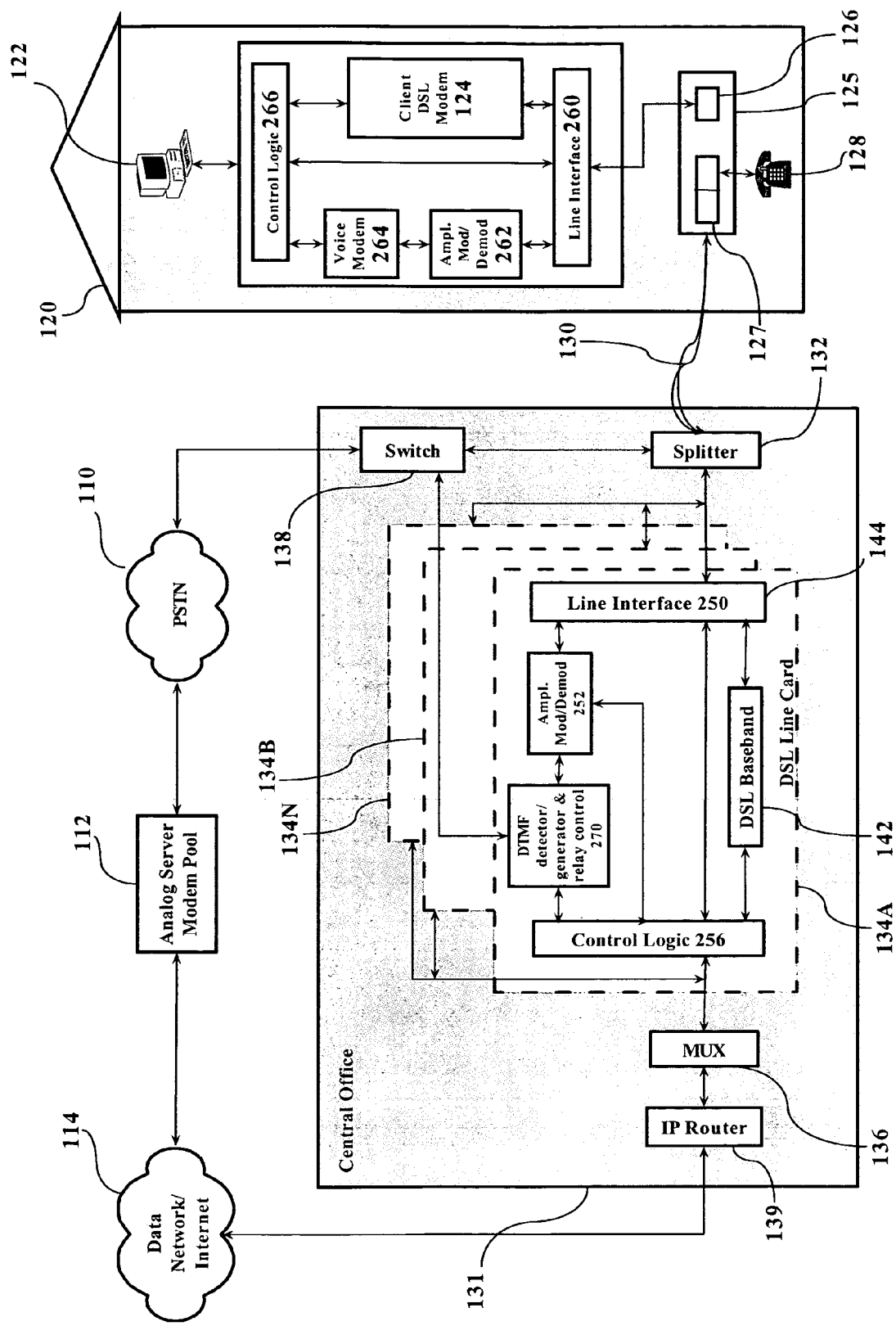
FIG. 3 illustrates the architecture of a second embodiment of the present invention.

FIG. 3 illustrates another embodiment of the present invention. In this embodiment, the voice band modem 254 of FIG. 2 is replaced with DTMF detector/generator and relay control 270. DTMF detector/generator and relay control 270 comprises the regular phone interfaces, general tone detector and generator, basic switching logic and relays to open and close the connections between itself and switch 138. It should be noted that the signals between amplitude modulator/demodulator 252 and DTMF detector/generator and relay control 270 are actually the voice band signals identical to the one passing from telephone 128 to switch 138. Using this configuration, the backup data connection between communication device 122 and data network/Internet 114 through voice-band modems is not through the CO's IP router. Rather, the control logic 256 redirects the voice band signal from amplitude modulator/demodulator 252 to DTMF detector/generator and relay control 270 and then to switch 138, so that the client side voice-band modem 264 connects to the analog server modem pool 112 of an ISP. Communication device 122 connects to data network/Internet 114 through the analog server modem pool 112.

The operation of the FIG. 3 configuration is as follows. Once control logic 266 detects that the DSL connection has been broken and cannot be immediately reestablished, it stops DSL communication and activates the backup voice band modem 264 by causing it dial an ISP analog server modem pool telephone number. The DTMF tones travel through filtering element 262 (the frequency is higher than the regular voice band at this point), line interface 260, connector 126, twisted wire pair 130, splitter 132, and line interface 250, and then it is demodulated down to a voice band signal through amplitude modulator/demodulator 252 before reaching DTMF detector/generator and relay control 270. Control logic 256 acknowledges the dialed digits through DTMF detector/generator and relay control 270 DTMF detection logic and then instructs DTMF detector/generator and relay control 270 to close the phone line relay connecting to switch 138. Upon receiving the dial tone from switch 138, DTMF detector/generator and relay control 270 sends the DTMF tones representing the dialing phone number and then closes relays to directly connect filtering element 252 to switch 138. From this point, the backup modem 264 establishes the modem connection with the analog server modem pool just as though it were connected to the regular phone line using the voice band. The major difference is that the voice band modem signal from home 120 to central office 131 is passing through the twisted pair lines 130 at the higher frequency band.

The first embodiment described above is particularly well suited to be used by telephone companies providing DSL service where the user accesses the Internet via the phone company's IP routers. The second embodiment is tailored to be used by ISPs such as America On Line (AOL). AOL offers its services through a dial-up modem pool and offers AOL broadband through DSL or a cable modem connection. The AOL broadband/DSL users access the Internet through AOL's IP server, which provides extra value-added features such as search engines, parental controls, etc. The users with AOL broadband service through DSL are usually using the DSL connection through the IP router as a data "tunnel". Sometimes a DSL service provider's router or network backbone can experience congestion or can break down. In this case, the AOL broadband/DSL user will experience a breakdown in the DSL tunnel connection to the Internet. This is referred to as DSL network layer failure. Note that in the second embodiment, the ISP has an analog server modem pool and its own data network backbone which is not the same as those of the DSL service provider's. The likelihood of both networks having router or backbone failure is very small. However, even if this happens, utilizing the second embodiment, the AOL (or other ISP) users can still connect to the Internet through the backup data "tunnel" through AOL's analog server modem pool while the user's regular phone line is not occupied.

Using the above system, a subscriber receives uninterrupted data service, albeit slower than DSL data service, without interrupting the user's voice channel. This is a significant improvement over the prior art and enables the user to have an essentially seamless back-up system in place at all times so that data transmissions are not interrupted and voice communications can continue as normal.

Figure 4:
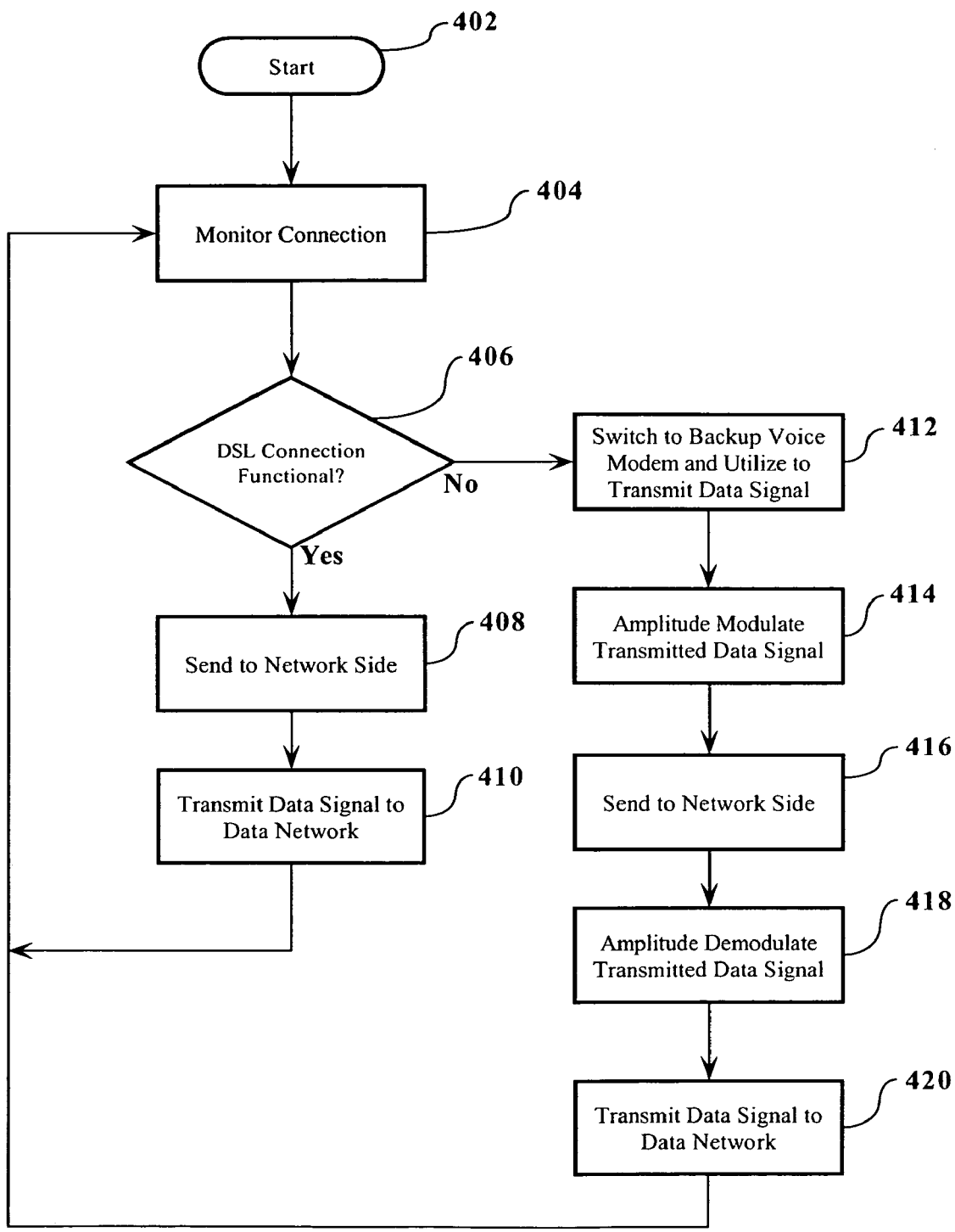
FIG. 4 is a flowchart illustrating a basic set of steps embodying a method in accordance with the present invention.

FIG. 4 is a flowchart illustrating a basic set of steps embodying the present invention. Referring to FIG. 4, at step 402, the process starts. This step typically would coincide with the activation of data-communication device 122, such as a PC. At step 404, the data connection being used by the data-communication device is monitored. Assuming the data connection is operating properly, the monitoring step will reveal the presence of a correctly operating DSL connection.

At step 406, a determination is made as to whether or not the DSL connection is functional. If it is determined to be functional, the process proceeds to step 408 and any data being transmitted from the data-communication device is transmitted to the network side using the DSL connection, and at step 410, the data signal is transmitted to the data network.

If, at step 406, it is determined that the DSL connection is non-functional, then the process proceeds to step 412, where the backup voice modem is activated and utilized in conjunction with the amplitude modulator/demodulator for data transmission. At step 414, data transmitted by the data-communications device is amplitude modulated and then, in its amplitude-modulated state (i.e., at a DSL frequency), transmitted to the network side. At step 418, the transmitted data signal is amplitude-demodulated (i.e., back to voice band), and at step 420 the transmitted data signal is sent to the data network. It is understood that the path of a transmission from the data network to the data-communication device on the subscriber side follows the same process, i.e., it is amplitude modulated and travels to the subscriber side as an amplitude-modulated signal until it is amplitude demodulated by the amplitude modulator/demodulator on the subscriber side.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation located in the subscriber premises and/or in the central office. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A system for providing an uninterrupted data connection between a client device and a data network via a Central Office (CO) when a Digital Subscriber Line (DSL) connection between the client device and the data network fails, comprising:

a client-side sub-system coupled to the client device, said client-side sub-system comprising:

a DSL modem modulating data input from said client device to a DSL band signal;

a voice-band modem modulating data input from said client device to a voice-band-frequency signal;

an amplitude modulator/demodulator, coupled to said voice-band modem, upshifting said voice-band-frequency signal to a shifted signal having a frequency higher than voice-band frequency;

an interface, coupled to said DSL modem and said amplitude modulator/demodulator, routing one of said DSL band signal from said DSL modem and said shifted signal to said CO; and a controller configured to sense a failure of the DSL connection and, responsive to sensing the failure of the DSL connection, to switch the data connection from utilization of the DSL modem to utilization of said voice-band modem and said amplitude modulator/demodulator, said switching comprising configuring said interface to route said shifted signal instead of said DSL band signal from said DSL modem.

2. A system as set forth in claim 1, wherein said amplitude modulator/demodulator also receives signals having a frequency higher than voice-band frequency from said CO via said interface, downshifts said signals received from said CO to voice-band frequency, inputs said downshifted signals to said voice-band modem, which demodulates said downshifted signal to a data signal that is input to said client device.

3. A system for providing an uninterrupted data connection between a client device and a data network via a Central Office (CO) when a Digital Subscriber Line (DSL) connection between the client device and the data network fails, comprising:

a client-side sub-system coupled to the client device, said client-side sub-system comprising:

a first DSL modem modulating data input from said client device to a first DSL band signal;

a first voice-band modem modulating data input from said client device to a first voice-band-frequency signal;

a first amplitude modulator/demodulator, coupled to said first voice-band modem, upshifting said first voice-band-frequency signal to a first shifted signal having a frequency higher than voice-band frequency; and a first interface, coupled to said first DSL modem and said first amplitude modulator/demodulator, routing one of said first DSL band signal and said first shifted signal to said CO;

a CO-side sub-system coupled between the data network and said client-side subsystem, said CO-side sub-system comprising:

a second DSL modem modulating data input from the data network to a second DSL band signal;

a second voice-band modem modulating data from said data network to a second voice-band-frequency signal;

a second amplitude modulator/demodulator, coupled to said second voice-band modem, upshifting said second voice-band-frequency signal from said second voice-band modem to a second shifted signal having a frequency higher than voice-band frequency; and a second interface, coupled to said second DSL modem and said second amplitude modulator/demodulator, routing one of said second DSL band signal and said second shifted signal to said client-side subsystem; and a controller, said controller sensing a failure of the DSL connection and, responsive to sensing the failure of the DSL connection, switching the data connection from utilization of the first DSL modem and the second DSL modem to utilization of said first voice-band modem and said second voice-band modem, said switching comprising configuring said first interface to route said first shifted signal instead of said first DSL band signal and configuring said second interface to route said second shifted signal instead of said second DSL band signal.

4. A system as set forth in claim 3, wherein said second amplitude modulator/demodulator also receives signals having a frequency higher than voice-band frequency from said client-side subsystem via said second interface, downshifts said signals received from said client-side subsystem to voice-band frequency, inputs said downshifted signals to said second voice-band modem, which demodulates said downshifted signal to a data signal that is forwarded to said data network.

5. The system of claim 3, wherein said client-side subsystem further comprises said controller coupled to said client device and said first voice-band modem.

6. The system of claim 3, wherein said CO-side subsystem further comprises said controller coupled to said data network and said second voice-band modem.

7. A method for providing an uninterrupted data connection between a client device and a data network via a Central Office (CO) when a Digital Subscriber Line (DSL) connection between the client device and the data network fails, comprising:

sensing a failure of the DSL connection and, responsive to sensing the failure of the DSL connection:
modulating data input from said client device to a voice-band-frequency signal;
upshifting said voice-band-frequency signal to a shifted signal having a frequency higher than voice-band frequency; and
routing said shifted signal to said CO; and
responsive to not sensing the failure of the DSL connection, modulating data input from the client device to a DSL band signal and routing said DSL band signal to said CO.

8. The method of claim 7, further comprising:
receiving, from said CO, a signal having a frequency higher than voice-band frequency;
downshifting said signal received from said CO to voice-band frequency; and
demodulating said downshifted signal to a data signal that is input to said client device.

9. The method of claim 8, further comprising:
modulating data from said data network to a voice-band-frequency signal;
upshifting said voice-band-frequency signal from said data network to a signal having a frequency higher than voice-band frequency; and
routing said shifted signal to said client-side subsystem.

10. The method of claim 9, further comprising:
receiving, from said client-side subsystem, a signal having a frequency higher than voice-band frequency;
downshifting said signal received from said client-side subsystem to voice-band frequency; and
demodulating said downshifted signal to a data signal that is forwarded to said data network.

11. An apparatus for providing communications capability between a client location and a Central Office (CO), comprising:

a DSL modem modulating data input to DSL band signals;
a voice-band modem modulating data input to voice-band-frequency signals;
an amplitude modulator/demodulator coupled to said voice-band modem, and a controller;
said amplitude modulator/demodulator upshifting outgoing voice-band-frequency signals output from said voice-band modem to shifted signals having a frequency higher than voice-band frequency, and downshifting to voice band frequency incoming signals having a frequency higher than voice-band frequency; and
wherein said controller is configured to sense a failure of a Digital Subscriber Line (DSL) connection between the client location and the CO and, responsive to sensing the failure of the DSL connection, to switch the data connection from utilization of said DSL modem to utilization of said voice-band modem and said amplitude modulator/demodulator, said switching comprising routing to the CO said shifted signals instead of said DSL band signals.

12. The system of claim 1, wherein the shifted signal having a frequency higher than voice-band frequency is a DSL band signal.

13. The system of claim 1, wherein the voice-band-frequency signal has a frequency of less than about 4 kHz.

14. The system of claim 1, wherein the shifted signal having a frequency higher than voice-band frequency has a frequency between about 25 kHz and about 1100 kHz.

15. The method of claim 7, wherein the shifted signal having a frequency higher than voice-band frequency is a DSL band signal.

16. The method of claim 7, wherein the voice-band-frequency signal has a frequency of less than about 4 kHz.

17. The method of claim 7, wherein the shifted signal having a frequency higher than voice-band frequency has a frequency between about 25 kHz and about 1100 kHz.

18. The apparatus of claim 11, wherein the shifted signals having a frequency higher than voice-band frequency are DSL band signals.

19. The apparatus of claim 11, wherein the voice-band-frequency signals have a frequency of less than about 4 kHz.

20. The apparatus of claim 11, wherein the shifted signals having a frequency higher than voice-band frequency have a frequency between about 25 kHz and about 1100 kHz.

* * * * *